(12) United States Patent
Khorlin et al.

(10) Patent No.: US 8,543,589 B2
(45) Date of Patent: Sep. 24, 2013

(54) METHOD AND APPARATUS FOR INTEGRATING RELATIONAL AND HIERARCHICAL DATA

(75) Inventors: Andrey Khorlin, Sunnyvale, CA (US); Robert Evan Strom, Ridgefield, CT (US); Lu Tian, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 12/580,815

(22) Filed: Oct. 16, 2009

(65) Prior Publication Data

US 2010/0036826 A1   Feb. 11, 2010

Related U.S. Application Data

(63) Continuation of application No. 11/541,260, filed on Sep. 29, 2006, now abandoned.

(51) Int. Cl.
*G06F 7/08*   (2006.01)
*G06F 17/30*   (2006.01)

(52) U.S. Cl.
USPC ............ 707/760; 707/755; 707/713; 707/809

(58) Field of Classification Search
USPC ......... 707/999.004, 999.102, 999.1, 999.107, 707/755, 760, 803; 717/136, 140
See application file for complete search history.

(56) References Cited

U.S. PATENT DOCUMENTS

| 5,295,256 | A | 3/1994 | Bapat |
| 6,947,945 | B1 | 9/2005 | Carey et al. |
| 7,383,255 | B2 | 6/2008 | Desai et al. |
| 7,523,131 | B2 | 4/2009 | Warner et al. |
| 2004/0260691 | A1 | 12/2004 | Desai et al. |
| 2004/0267760 | A1* | 12/2004 | Brundage et al. ............. 707/100 |
| 2005/0234889 | A1 | 10/2005 | Fox et al. |
| 2006/0179068 | A1 | 8/2006 | Warner et al. |

OTHER PUBLICATIONS

P. Bohannon et al., "LegoDB: Customizing Relational Storage for XML Documents," Proceedings of the 28th VLDB Conference, 2002, 4 pages.
Y. Diao et al., "Towards an Internet-Scale XML Dissemination Service," Proceedings of the 30th VLDB Conference, 2004, pp. 612-623, vol. 30.
C. Koch et al., "FluXQuery: An Optimizing XQuery Processor for Streaming XML Data," Proceedings of the 30th VLDB Conference, 2004, pp. 1309-1312.
Anjul Bhambhri, "Firing Up the Hybrid Engine," IBM Database Magazine, Jul. 2005, 7 pages, vol. 10, No. 3.
P. Cimprich et al., Streaming Transformations for XML (STX) Version 1.0 Working Draft May 5, 2003, http://stx.sourceforge.net/documnts/spec-stx-20030505.html, 55 pages.

* cited by examiner

*Primary Examiner* — Bruce Moser
(74) *Attorney, Agent, or Firm* — Louis J. Percello; Ryan, Mason & Lewis, LLP (57) ABSTRACT

Methods and apparatus for integrating relational and hierarchical data, schema definitions, and queries in a data processing system are provided. One or more schema definitions are converted into an intermediate schema language component of an intermediate data language when one or more schema definitions are provided. One or more query expressions are converted into an intermediate query language component of the intermediate data language when one or more query expressions are provided. The intermediate schema language component or the intermediate query language component is compiled in an intermediate data language processing engine into a run-time representation in accordance with a relational-hierarchical analysis.

21 Claims, 5 Drawing Sheets

FIG. 2

| T | FLIGHT NO. | SEATS BOOKED | PASSENGERS.ID | PASSENGERS.NAME |
|---|---|---|---|---|
| 1 | AA141 | 2 | 1 | JOHN |
| 1 | AA141 | 2 | 2 | JACK |

FIG. 3

| T | FLIGHT NO. | SEATS BOOKED | PASSENGERS |
|---|---|---|---|

| | | | ID | NAME |
|---|---|---|---|---|
| 1 | AA141 | 2 | 1 | JOHN |
| | | | 2 | JACK |

FUNCTIONAL DEPENDENCY

T → FLIGHT NO.
T → SEATS BOOKED
T, PASSENGERS.ID → PASSENGERS.NAME

FIG. 4

| T | ID | FLIGHT NO. | SEATS BOOKED | PASSENGERS.NAME |
|---|----|------------|--------------|-----------------|
| 1 | 1  | AA141      | 2            | JOHN            |
| 1 | 2  | AA141      | 2            | JACK            |

| FUNCTIONAL DEPENDENCY |
|-----------------------|
| T, ID → FLIGHT NO. |
| T, ID → SEATS BOOKED |
| T, ID → PASSENGERS.NAME |

FIG. 5

| PASSENGERS | | |
|---|---|---|
| | | EMERGENCY CONTACTS |
| ID | NAME | ID | NAME |

| T | FLIGHT NO. | SEATS BOOKED |
|---|------------|--------------|

| T | FLIGHT NO. | SEATS BOOKED | PASSENGERS.ID | PASSENGERS.NAME |
|---|------------|--------------|---------------|-----------------|

| T | FLIGHT NO. | SEATS BOOKED | PASSENGERS.EmergencyContacts.ID | PASSENGERS.EmergencyContacts.Name |
|---|------------|--------------|---------------------------------|-----------------------------------|

*FIG. 6*

| OPERATORS | FUNCTIONAL DEPENDENCY INFERENCE RULES |
|---|---|
| EXTEND | THE FUNCTIONAL DEPENDENCY OF A NEW COLUMN IS A UNION OF ALL FUNCTIONAL DEPENDENCIES OF ALL COLUMNS USED IN THE ARITHMETIC EXPRESSION TO DEFINE THIS NEW COLUMN. |
| SELECT | IN THE GENERAL CASE, SELECTION DOESN'T AFFECT FUNCTIONAL DEPENDENCIES. HOWEVER, UNDER THE CIRCUMSTANCE WHERE SELECTION ESTABLISHES EQUIVALENCE BETWEEN COLUMNS (e.g. SELECT R WHERE a == b) IT CREATES NEW FUNCTIONAL DEPENDENCIES. SINCE THE COLUMNS SPECIFIED IN THE EQUALITY TEST WILL HAVE THE SAME VALUES, WHATEVER WAS DEPENDENT ON ONE COLUMN WOULD NOW BE ALSO DEPENDENT ON THE OTHER, AND VICE VERSA. |
| JOIN | THE JOIN OPERATION DOESN'T CREATE OR DESTROY FUNCTIONAL DEPENDENCIES. THE JOIN AS DEFINED ABOVE IS PERFORMED ON COLUMNS THAT NAMED SIMILARLY AND IF NO SUCH COLUMNS ARE PRESENT, THE FULL JOIN IS PERFORMED. IN EITHER CASE, THE FUNCTIONAL DEPENDENCIES OF THE RESULTING RELATION ARE JUST FUNCTIONAL DEPENDENCIES OF TWO INPUT RELATIONS. |
| MERGE | SINCE MERGE OPERATION TAKES A UNION OF TWO RELATIONS WITH THE SAME SCHEMA, BOTH INPUT RELATIONS HAVE THE SAME LIST OF FUNCTIONAL DEPENDENCIES. THEREFORE, THE RELATION PRODUCED BY THE MERGE OPERATION WILL HAVE THE SAME FUNCTIONAL DEPENDENCIES AS THE INPUT RELATIONS. |
| TOP K | TOP K DOESN'T AFFECT FUNCTIONAL DEPENDENCIES IN GENERAL CASE. HOWEVER, WHEN K = 1, THE RESULTING GROUP IN WHICH TOP K SELECTION WAS PERFORMED WILL HAVE ONE ROW. THIS CREATES A FUNCTIONAL DEPENDENCY BETWEEN THE COLUMN BEING SELECTED AND THE COLUMNS USED TO DEFINE THE GROUP. |
| PROJECT | THE PROJECT OPERATION DOESN'T REMOVE OR CREATE FUNCTIONAL DEPENDENCIES. |
| SPLIT | WHEN SPLITTING A COLUMN, ALL OTHER COLUMNS THAT USED TO DEPEND ON THE SPLIT COLUMN WOULD AFTER THE SPLIT DEPEND ON TWO RESULTING COLUMNS. FOR EXAMPLE, CONSIDER T IN THE "BOOKED SEATS" TABLE FROM EXAMPLE ABOVE BEING SPLIT INTO "MINUTES" AND "SECONDS", THEN "FLIGHT NO." WILL DEPEND ON BOTH "MINUTES" AND "SECONDS".<br><br>IN THE SAME TIME, THE TWO NEW COLUMNS RESULTED FROM SPLIT WILL HAVE THE SAME FUNCTIONAL DEPENDENCIES AS THE ORIGINAL COLUMN. FOR EXAMPLE, IF COLUMN T WAS DEPENDENT ON HYPOTHETICAL T', THEN BOTH "SECONDS" AND "MINUTES" WOULD HAVE HAD DEPENDENCY ON T' AFTER THE SPLIT. |
| COMBINE | COMBINE IS A REVERSE OPERATION FROM SPLIT. THEREFORE, THE FUNCTIONAL DEPENDENCY FOR A NEW COLUMN IS A UNION OF FUNCTIONAL DEPENDENCIES OF COLUMNS BEING COMBINED. MOREOVER, ALL COLUMNS THAT USED TO DEPEND ON EITHER OF COMBINED COLUMNS WILL DEPEND ON THE COMBINED COLUMN AFTER THIS OPERATION IS PERFORMED. |

METHOD AND APPARATUS FOR INTEGRATING RELATIONAL AND HIERARCHICAL DATA

CROSS-REFERENCE TO RELATED APPLICATION(S)

This application is a continuation of pending U.S. application Ser. No. 11/541,260 filed on Sep. 29, 2006, the disclosure of which is incorporated by reference herein.

FIELD OF THE INVENTION

The present invention relates generally to data processing techniques and, more particularly, to techniques for integrating relational and hierarchical data, schema definitions, and queries in a data processing system.

BACKGROUND OF THE INVENTION

Two main standards of describing and querying data have evolved. One of these standards is based on a relational model that is used by most modem databases. The other is based on a hierarchical model, examples of which include, XML (Extensible Markup Language), XML Schema Language (XSD) and XQuery Language.

XML is a specification language created to describe data interchange formats and data semantics. An XML document consists of data annotation tags that represent relationships between data values. An XML schema is an auxiliary document describing the structure of an XML document making it easier to interpret. XQuery is a language for querying information from XML documents.

Before the inception of XML, the majority of data was stored in relational tables. A relational table is a data structure that represents a mathematical mapping between one or more types of data. Relational databases store information by organizing data in normalized tables where the stored information can be retrieved through querying languages based on Relational Algebra, an example being Structured Query Language (SQL).

As XML continues to gain popularity, the need for effective integration of hierarchical data expressions and relational data expressions grows. Effective integration between the two has proven difficult because of key differences between them. For example, XML documents organize data in a hierarchical structure with multiple levels of nesting, while the relational model organizes data in flat tables with inter-table functional dependencies. Additionally, in hierarchical data expressions, document order of a node (the position each node occurs in the document) is important, while in relational data expressions document order is not relevant.

Previous attempts have been made at developing techniques to effectively integrate hierarchical data schemas and relational data schemas. These attempts have suffered from problems such as excessive use of the computationally very expensive "join" operation. Such attempts include, XML shredding, as described in P. Bohannon et al., "LegoDB: Customizing Relational Storage for XML Documents," 2002, mapping XML data values to a set of predefined tables based on node type, and mapping XML data to a relational table by number-encoding each of the XML data values.

Attempts have also been made to convert queries written over hierarchical data into queries over relational data. These attempts have suffered shortfalls similar to those described above. These attempts are described in Y. Diao et al., "Towards an Internet-Scale XML Dissemination Service," VLDB, 2004, and C. Koch et al., "FluXQuery: An Optimizing XQuery Processor for Streaming XML Data," VLDB, 2005. These attempts include a pure XML engine to handle processing, and translating hierarchical queries into relational queries.

Various techniques have been proposed for specifying "continuous queries" over steams. In these environments, data is not fixed, but arrives one message at a time in one or more continuous streams. Queries define views over the entire history of one or more streams. Rather than receiving a single result set, subscribers to continuous queries receive a continuously updated result set reflecting how the view changed as a result of the changes to the streams on which it depends. In a mixed environment, any of the following combinations are possible: schemas defined in a relational (SQL) or hierarchical style (XML); messages delivered in a relational (flat) or hierarchical format (XML); and queries written in a relation language (SQL) or hierarchical language (XQUERY/XSLT).

SUMMARY OF THE INVENTION

The present invention provides techniques for integrating relational and hierarchical data, schema definitions, and queries in a data processing system through the use of an intermediate data language. While not limited thereto, such techniques have been developed and tested for use with XML documents and schemas, and XQuery and SQL language for querying.

By way of example, in one aspect of the invention, a method for integrating relational and hierarchical data, schema definitions, and queries in a data processing system is provided. One or more schema definitions are converted into an intermediate schema language component of an intermediate data language when one or more schema definitions are provided. One or more query expressions are converted into an intermediate query language component of the intermediate data language when one or more query expressions are provided. The intermediate schema language component or the intermediate query language component is compiled in an intermediate data language processing engine into a run-time representation in accordance with a relational-hierarchical analysis.

In an additional embodiment of the present invention, the one or more schema definitions may be relational schema or hierarchical schema. Further, the one or more query expressions may be one or more relational query expressions or one or more hierarchical query expressions.

In another additional embodiment of the present invention, the compiling step may include analyzing the intermediate schema language component or the intermediate query language component to capture relationships between at least one of relational tuples and hierarchical data. The steps of determining, converting and compiling may be repeated for additional input data, and the compiling step may be performed in accordance with relationships between at least one of relational tuples and hierarchical data captured from previously input data.

In further embodiments of the present invention, the analyzing step may include the step of computing functional dependency information for augmentation with the intermediate schema language component or the intermediate query language component. The functional dependency information may be utilized to determine redundant cells and a hierarchical representation of the intermediate schema language component or the intermediate query language component.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 is a table illustrating rules used by the intermediate data language for deriving functional dependencies during querying, according to an embodiment of the present invention;

DETAILED DESCRIPTION OF PREFERRED EMBODIMENTS

The following description will illustrate the present invention using exemplary data processing system architecture. It should be understood, however, that the invention is not limited to use with any particular system architecture. The invention is instead more generally applicable to any task that would benefit from the integration of hierarchical data expressions and relational data expressions.

As will be illustrated below the present invention introduces techniques for integrating relational and hierarchical data, schema definitions, and queries through the use of an intermediate data language.

As discussed herein the term "hierarchical data" may generally refer to a structure of data having several levels arranged in a tree-like structure. The term "relational data," as used herein, may refer to a structure of data that is represented as a series of mathematical relations. By way of example, a relational database stores information by organizing data into normalized flat tables, without the multiple levels of nesting seen in a database with a hierarchical structure. The term "functional dependency" as used herein may refer to a mathematical relation between sets of columns in a given database. If a first column set depends on a second column set such that for a unique combination of values for the first column set there is at most one value for each column of the second column set, then a functional dependency exists between the two columns.

Figure 1:
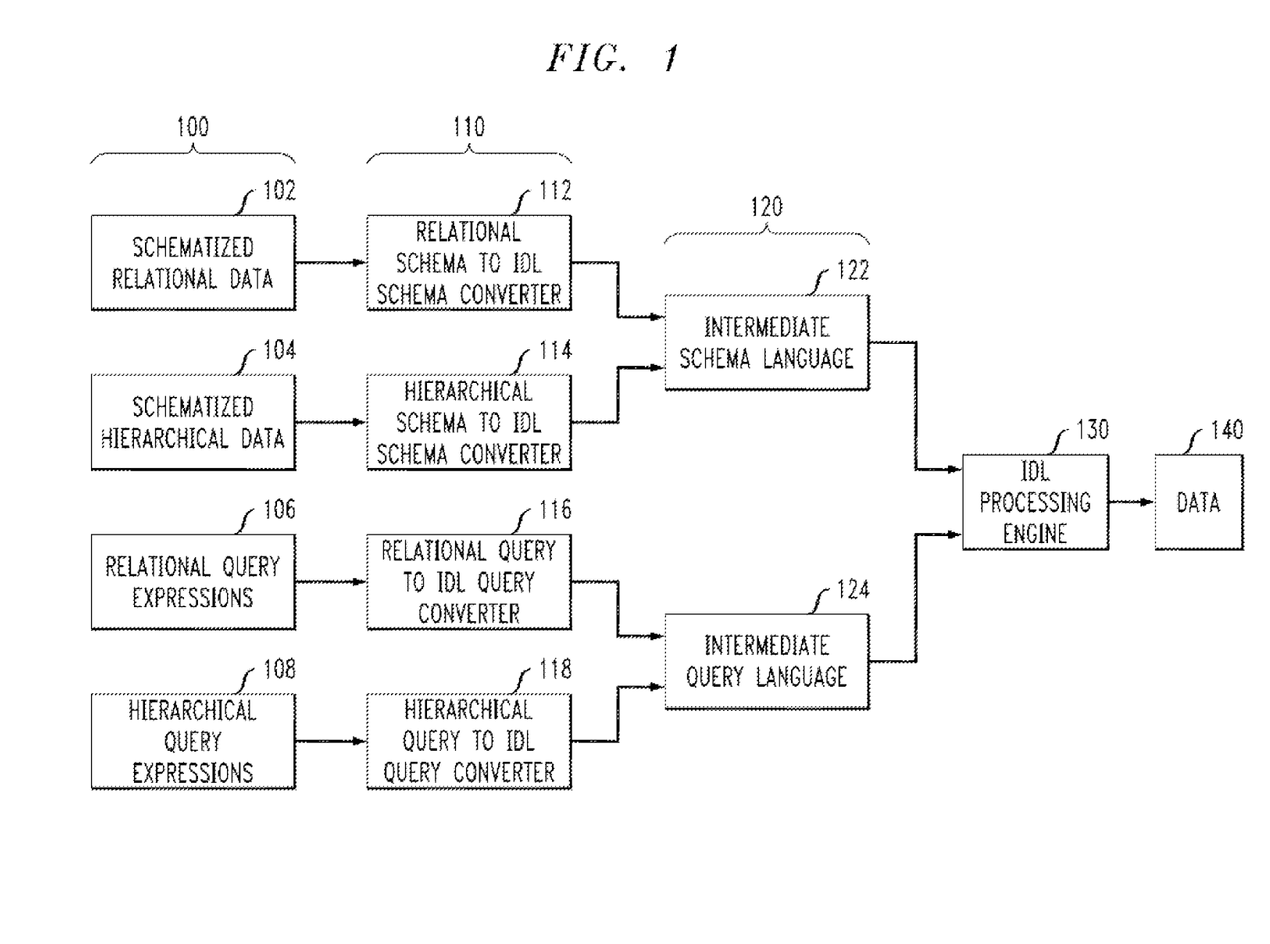
FIG. 1 is a block diagram illustrating a process for integrating relational data expressions and hierarchical data expressions, according to an embodiment of the present invention.

Referring initially to FIG. 1, a block diagram illustrates a process for integrating relational data expressions and hierarchical data expressions, according to an embodiment of the present invention. The process converts relational and hierarchical inputs into a relational like intermediate data language. Relational and hierarchical data expressions 100 are input to an intermediate data language converter 110 resulting in the conversion of relational and hierarchical data expressions 100 into an intermediate data language 120. Relational and hierarchical data expressions 100 now expressed in intermediate data language 120, are passed to an intermediate data language processing engine 130 that uses the data definitions and queries to process the data. Data 140 can then be stored in a database system or any system designed for processing structured, schematized data. By way of example, this process allows for queries written in a relational language (SQL) to be processed against hierarchical data and vice versa.

As shown in FIG. 1, relational and hierarchical data expressions 100, may include schematized data in relational form 102, schematized data in hierarchical form 104, query expressions written in a relational language 106 and query expressions written in a hierarchical language 108. Schematized relational data 102 is input into a relational schema to IDL converter 112 which converts the data into an intermediate schema language 122. Once in intermediate schema language 122, the data may be input into block 130 in accordance with the steps described above. Schematized hierarchical data 104 is input into a hierarchical schema to IDL schema converter 114 which converts the data into intermediate schema language 122. Once in intermediate schema language 122, the data can be input into block 130 in accordance with the steps described above.

Relational query expressions 106 are input into a relational query to IDL query converter 116 which converts the data into an intermediate query language 124. Once in intermediate query language 124, the data can be input into block 130 in accordance with the steps described above. Hierarchical query expressions 108 are input into a hierarchical query to IDL query converter 118 which converts the data into intermediate query language 124. Once in intermediate query language 124, the data can be input into block 130 in accordance with the steps described above.

The intermediate data language is based on classical relational algebra. This intermediate data language is extended however, to be substantially compatible with nested data. The intermediate data language encompasses core relational operators for queries, including, the "select", "extend", "project", "top k", "join", "merge", "combine" and "split" operators in addition to several other arithmetic, logical and comparison operators.

Figure 2:
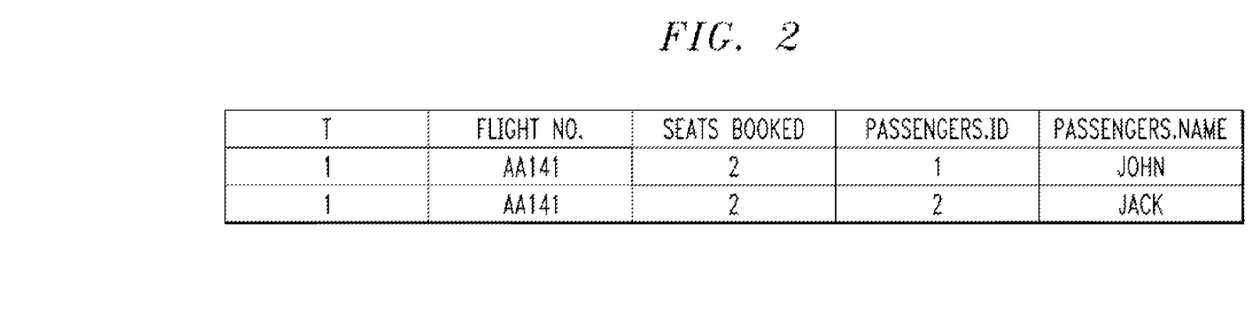
FIG. 2 is a table illustrating a set of flat relations, according to an embodiment of the present invention.

Referring now to FIG. 2, a table illustrates a set of flat relations according to an embodiment of the present invention. This is a more detailed example of block 102 of FIG. 1, which shows schematized relational data. The set of relations shown in this figure is typical of what would be stored in a relational data structure. The figure shows a flat table with relations "T", "Flight No", "Seats Booked", "Passengers.ID." and "Passengers.Name."

Figure 3:
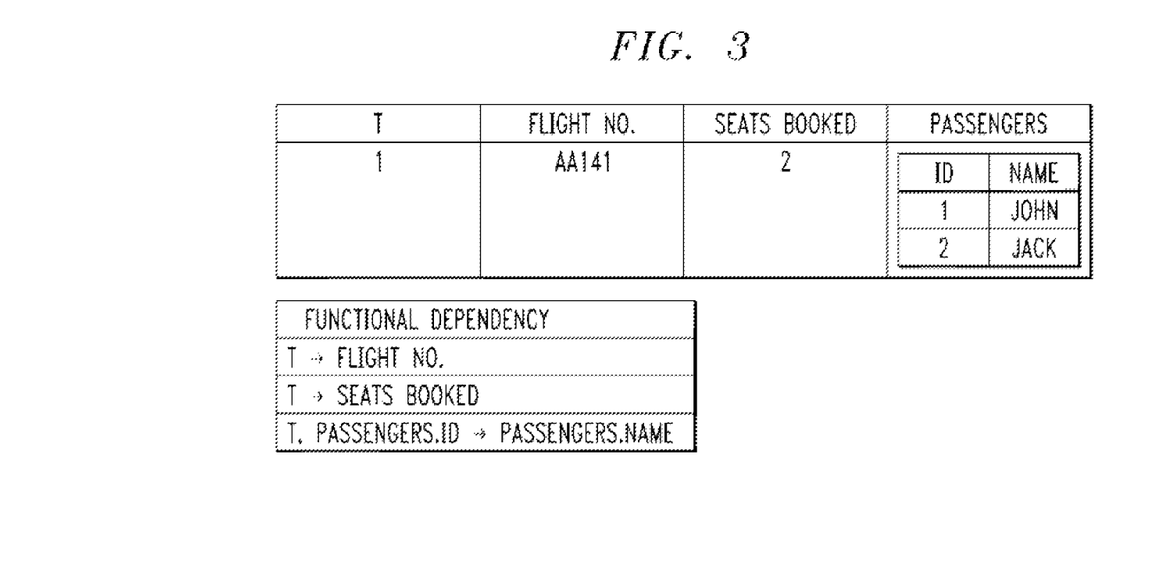
FIG. 3 is set of tables illustrating a set of nested relations having functional dependencies, corresponding to the flat relations of FIG. 2, according to an embodiment of the present invention.

Referring now to FIG. 3, a set of tables illustrates a set of nested relations having functional dependencies, corresponding to the flat relations of FIG. 2, according to an embodiment of the present invention. The nested relations shown in FIG. 3 are an example of a hierarchical schematized data expression as shown in block 104 of FIG. 1. The table of functional dependencies demonstrates that with the data in field "T" the data in fields "Flight No" and "Seats Booked" may be determined, and with the data in fields "T" and "Passengers.ID"

the data in the field "Passengers.Name" may be determined. As can be seen from the figures, the set of nested relations is equivalent to a corresponding set of flat relations with identical functional dependencies as shown in FIG. 2.

The set of nested relations is also equivalent to a denormalized flat relation which is the join of the set of normalized flat relations. The intermediate language treats the query as if it were executed over this denormalized relation, however, at execution time, the compiler actually represents the data more compactly either as a hierarchical structure, or as a set of normalized tables. The denormalized form is one that would be very inefficient if actually materialized, but it allows queries either in an SQL-like form or in an XQUERY-like form to be interpreted appropriately. This assumes that the compiler retains the functional dependencies.

Figure 4:
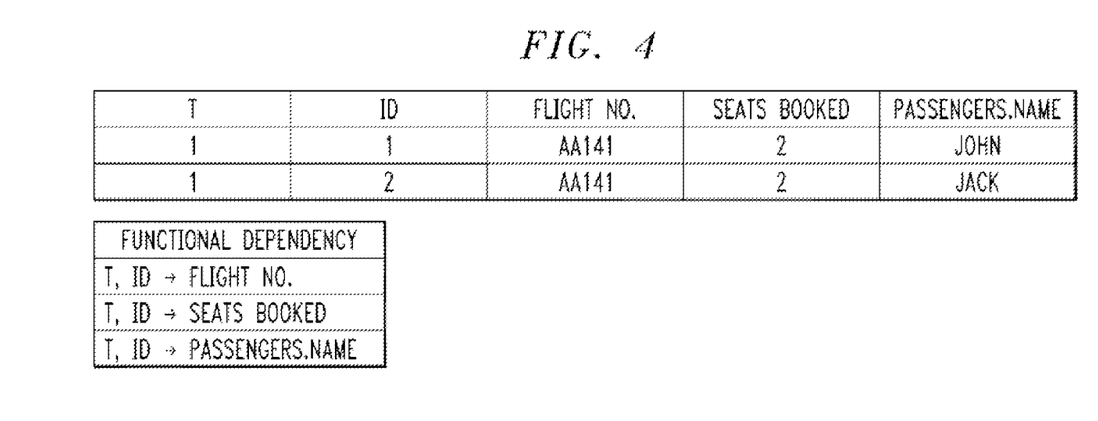
FIG. 4 is a table illustrating a set of flat relations with corresponding functional dependencies, according to an embodiment of the present invention.

Referring now to FIG. 4, a set of tables illustrates flat relations with corresponding functional dependencies, according to an embodiment of the present invention. FIG. 4 illustrates a typical set of functional dependencies for a flat set of relations. As can be seen from FIGS. 2, 3 and 4, the nesting structure of a given relation can be inferred from the given relation's functional dependencies.

Figure 5:
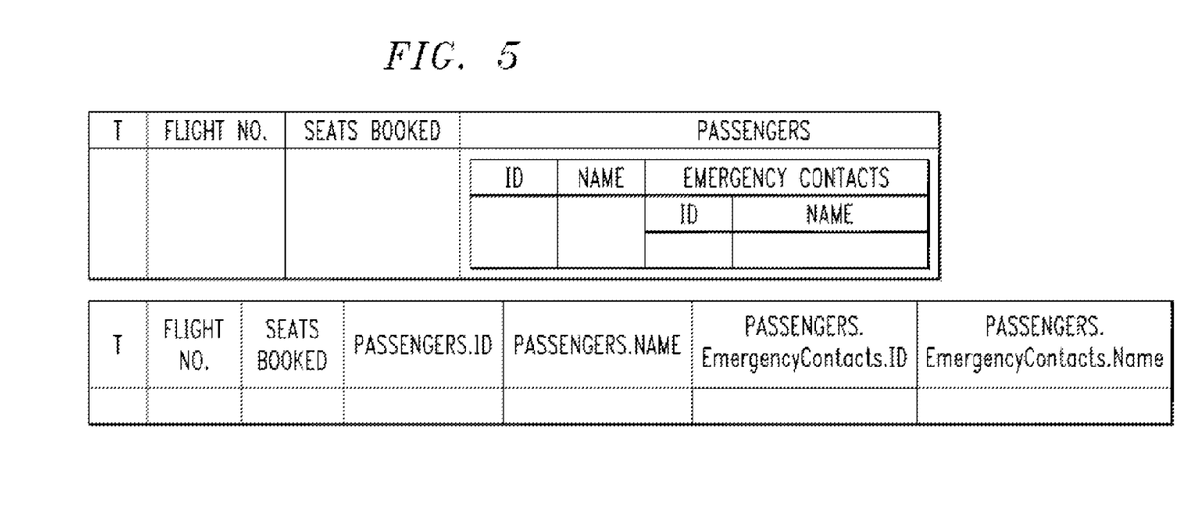
FIG. 5 is a set of tables illustrating a naming scheme allowing nested relations to be treated as flat, according to an embodiment of the present invention.

Referring now to FIG. 5, a set of tables illustrates a naming scheme allowing nested relations to be treated as flat, according to an embodiment of the present invention. In this naming scheme, the names of the inner columns are prepended with the names of the inner relations. This naming scheme is important in allowing intermediate data language, specifically block 120 of FIG. 1, to extend the traditional relational algebra to be substantially compatible with nested relations. If the nested relations are analogized to a tree like structure, then the column name outlines a path in that tree to where the column would be located.

The upper table of FIG. 5 shows relations "T", "Flight No.", "Seats Booked" and "Passengers". Within the field "Passengers", there are the nested fields "ID", "Name" and "Emergency Contacts". Within the nested field "Emergency Contacts" there is the further nested fields of "ID" and "Name". The lower table of FIG. 5 shows how to express these nested relations as flat. This table contains the fields "T", "Flight No" and "Seats Booked," however, unlike on the upper table of FIG. 5, the relations nested within the field "Passengers" are expressed differently. The term "Passengers" is simply prepended onto the fields of "ID", "Name" and "Emergency Contacts", and both the term "Passengers" and "Emergency Contacts" are prepended onto the fields of "ID" and "Name". The prepending of terms allows the information of the nested relations to be accurately expressed in a table of flat relations, thus allowing intermediate data language to use classical relational algebra to express both hierarchical and relational data expressions.

Referring now to FIG. 6, a table illustrates the rules used by the compiler for the intermediate data language for deriving functional dependencies during querying, according to an embodiment of the present invention. To interpret queries written in the intermediate data language, column names and functional dependencies need to be derived. For relations specified by hierarchical data expressions or relational data expressions the rule for deriving functional dependencies is that when each non-key column depends on the key column in the current relation and on all key columns of outer relations (if there are any) then there is a functional dependency. For relations derived via querying, the rules in FIG. 6 are used. FIG. 6 discloses functional dependency rules for the classical relational operators: "Extend", "Select", "Join", "Merge", "Top K", "Project", "Split" and "Combine".

In a streaming system, the compiler for the intermediate data language has the additional task of generating efficient code for continuously updating views of stream data as messages appending new tuples to streams arrive. A type analysis step computes additional properties of columns of relation given the intermediate language expression that derived that relation, and given the properties of the relation or relations that were input to that expression. Starting with the user-specified schema of the input streams, the system will successively apply steps of type analysis to views derived from these streams, and then to view derived from these views, until these properties are derived for all views. These properties allow the run-time to efficiently compute not just the current value of each row and column of the relation, but also will compute whether and to what degree that value can change.

This information is used both to advantageously compute whether an intermediate value needs to be saved, and it can also be used to signal to the consumer of such a view whether the value is final. A value which cannot change any more is final, and once it has been propagated to any views which need to know the vale it can be discarded. A consumer may wish to distinguish between the case where the number of responses received within the deadline is currently zero and the case where the number of responses received within the deadline is finally zero, because the deadline has passed.

The additional information computed by type analysis includes: the maximum positive and negative components of values of aggregate types and the maximum number of steps needed to reach finality; and whether the column is masked as a result of another Boolean selection value, as in SELECT*FROM T WHERE X>Y, in which an intermediate column representing the Boolean intermediate value of X>Y is created, and each column is typed as being masked by this intermediate value.

Functional dependencies alone can specify how many values are in a given column. For example, if column X depends on columns (K1, K2) and there are 100 values for K1 and 4 values for K2, there could be at most 4*100 values of X.

Figure 7:
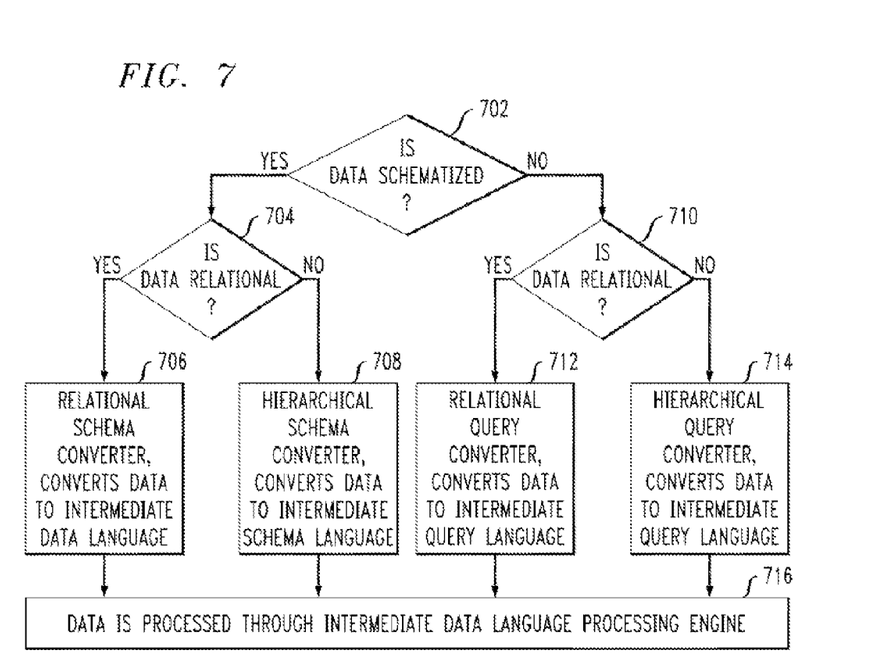
FIG. 7 is a flow diagram illustrating a relational/hierarchical data expression conversion methodology, according to an embodiment of the present invention.

Referring now to FIG. 7, a flow diagram illustrates a relational/hierarchical data expression conversion methodology, according to an embodiment of the present invention. In block 702 it is determined whether the data is schematized. If the data is schematized, block 704 determines whether the data is relational. If the data is relational then in block 706 a relational schema converter converts data to intermediate schema language. If the data is not relational, it is assumed that the data is hierarchical and then in block 708 a hierarchical schema converter converts data into intermediate schema language.

If it is determined that the data is not schematized in block 702, it is assumed that the data is a query. Block 710 then determines whether the data is relational. If the data is relational, then in block 712 a relational query converter converts data to an intermediate query language. If the data is not relational, it is assumed to be hierarchical, and in block 714 a hierarchical query converter converts data to intermediate query language. Once the data is in intermediate form, block 716 processes the data through an intermediate data language processing engine.

Figure 8:
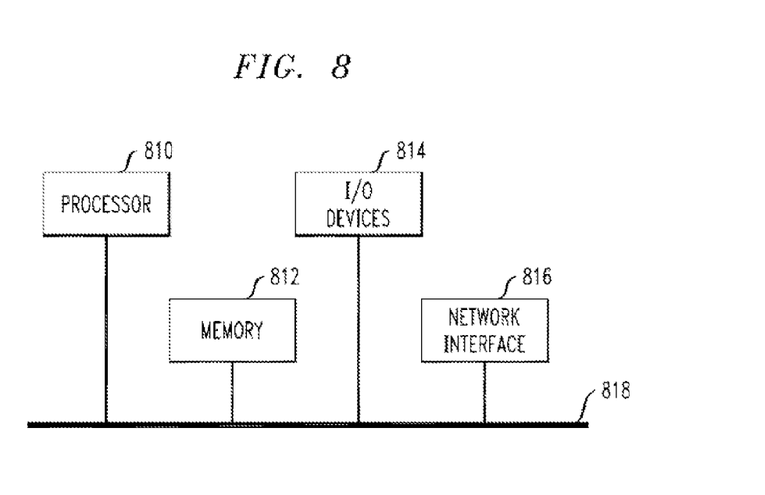
FIG. 8 is a diagram illustrating an illustrative hardware implementation of a computing system in accordance with which one or more components/methodologies of the present invention may be implemented, according to an embodiment of the present invention.

Referring now to FIG. 8, a block diagram illustrates an exemplary hardware implementation of a computing system in accordance with which one or more components/methodologies of the invention (e.g., components/methodologies described in the context of FIGS. 1-7) may be implemented, according to an embodiment of the present invention.

As shown, the computer system may be implemented in accordance with a processor 810, a memory 812, I/O devices 814, and a network interface 816, coupled via a computer bus 818 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with references to the accompanying drawings, it is to be understood that the invention is not limited to those precise embodiments, and that various other changes and modifications may be made by one skilled in the art without departing from the scope or spirit of the invention.

What is claimed is:

1. A method for integrating relational and hierarchical data, schema definitions, and queries in a data processing system, comprising the steps of:
   converting one or more schema definitions into an intermediate schema language component of an intermediate data language when one or more schema definitions are provided;
   converting one or more query expressions into an intermediate query language component of the intermediate data language when one or more query expressions are provided;
   compiling, in an intermediate data language processing engine, at least one of the intermediate schema language component and the intermediate query language component into a run-time representation in accordance with a relational-hierarchical analysis; and
   determining whether the schema definitions or the query expressions are relational prior to the converting steps;
   wherein the data processing system comprises a processor and memory for performing the converting, compiling and determining steps.

2. The method of claim 1, wherein, in the step of converting the one or more schema definitions, the one or more schema definitions comprise at least one of relational schema and hierarchical schema.

3. The method of claim 1, wherein, in the step of converting the one or more query expressions, the one or more query expressions comprise at least one of one or more relational query expressions and one or more hierarchical query expressions.

4. The method of claim 1, further comprising the step of choosing a preferred run-time representation for the intermediate schema language component in accordance with an analysis of at least one of the intermediate schema language component and the intermediate query language component.

5. The method of claim 1, wherein the compiling step comprises the step of analyzing at least one of the intermediate schema language component and the intermediate query language component to capture relationships between at least one of relational tuples and hierarchical data.

6. The method of claim 5, further comprising the step of repeating the converting and compiling steps for additional input data, wherein the compiling step is performed in accordance with relationships between at least one of relational tuples and hierarchical data captured from previously input data.

7. The method of claim 5, wherein the analyzing step comprises the step of computing functional dependency information for augmentation with at least one of the intermediate schema language component and the intermediate query language component.

8. The method of claim 7, wherein, in the analyzing step, the functional dependency information is utilized to determine redundant cells and a hierarchical representation of at least one of the intermediate schema language component and the intermediate query language component.

9. The method of claim 7, wherein at least one of the intermediate schema language component and the intermediate query language component comprises inner column names prepended with the names of the inner relations.

10. The method of claim 7, wherein the analyzing step comprises the step of computing at least one of maximum value ranges, maximum steps to value finality, and masking of columns as a result of a Boolean selection value.

11. The method of claim 1, wherein the one or more query expressions comprise continuous queries over streaming data.

12. The method of claim 1, wherein at least one of the intermediate schema language component and the intermediate query language component comprises classical relational algebra.

13. The method of claim 1, wherein the intermediate schema language component comprises one or more of the core relational operators.

14. The method of claim 1, wherein the relational-hierarchical analysis comprises a conversion of one or more nested relations associated with hierarchical data to one or more flat relations associated with relational data such that said one or more converted nested relations are queryable using one or more relational query operations.

15. Apparatus for integrating relational and hierarchical data, schema definitions, and queries in a data processing system, comprising:
   a memory; and
   at least one processor coupled to the memory and operative to: (i) convert one or more schema definitions into an intermediate schema language component of an intermediate data language when one or more schema definitions are provided; (ii) convert one or more query expressions into an intermediate query language component of the intermediate data language when one or more query expressions are provided; iii) compile, in an intermediate data language processing engine, at least one of the intermediate schema language component and the intermediate query language component into a run-time representation in accordance with a relational-hierarchical analysis; and (iv) determine whether the schema definitions or the query expressions are relational prior to the converting steps.

16. The apparatus of claim 15, wherein, in the operation of converting the one or more schema definitions, the one or more schema definitions comprise at least one of relational schema and hierarchical schema.

17. The apparatus of claim 15, wherein, in the operation of converting the one or more query expressions, the one or more query expressions comprise at least one of one or more relational query expressions and one or more hierarchical query expressions.

18. The apparatus of claim 15, wherein the compiling operation comprises the step of analyzing at least one of the intermediate schema language component and the intermediate query language component to capture relationships between at least one of relational tuples and hierarchical data.

19. The apparatus of claim 18, further comprising the operation of repeating the converting and compiling steps for additional input data, wherein the compiling operation is performed in accordance with relationships between at least one of relational tuples and hierarchical data captured from previously input data.

20. The apparatus of claim 18, wherein the analyzing operation comprises the step of computing functional dependency information for augmentation with at least one of the intermediate schema language component and the intermediate query language component.

21. An article of manufacture for integrating relational and hierarchical data, schema definitions, and queries in a data processing system, comprising a non-transitory machine readable storage medium containing one or more programs which when executed by a processor implement the steps of:

converting one or more schema definitions into an intermediate schema language component of an intermediate data language when one or more schema definitions are provided;

converting one or more query expressions into an intermediate query language component of the intermediate data language when one or more query expressions are provided;

compiling, in an intermediate data language processing engine, at least one of the intermediate schema language component and the intermediate query language component into a run-time representation in accordance with a relational-hierarchical analysis; and determining whether the schema definitions or the query expressions are relational prior to the converting steps.

* * * * *